US006872676B2

(12) United States Patent
Schaefer et al.

(10) Patent No.: US 6,872,676 B2
(45) Date of Patent: Mar. 29, 2005

(54) SEMICONDUCTIVE ZIRCONIA SINTERING MATERIAL COMPRISING ALUMINUM OXIDE

(75) Inventors: Matthew W. Schaefer, Arvada, CO (US); Frank E. Anderson, Golden, CO (US); Brian Seegmiller, Arvada, CO (US)

(73) Assignee: CoorsTek, Inc., Golden, CO (US)

( * ) Notice: Subject to any disclaimer, the term of this patent is extended or adjusted under 35 U.S.C. 154(b) by 0 days.

(21) Appl. No.: 10/424,569

(22) Filed: Apr. 25, 2003

(65) Prior Publication Data

US 2004/0029337 A1 Feb. 12, 2004

Related U.S. Application Data

(60) Provisional application No. 60/376,671, filed on Apr. 29, 2002.

(51) Int. Cl.$^7$ .............................................. C04B 35/488
(52) U.S. Cl. ........................ 501/105; 501/127; 501/153
(58) Field of Search ................................ 501/105, 127, 501/153

(56) References Cited

U.S. PATENT DOCUMENTS

| 4,900,701 | A | * | 2/1990 | Morishita et al. ............ 501/102 |
| 5,183,610 | A | * | 2/1993 | Brog et al. .................. 501/105 |
| 6,156,685 | A | * | 12/2000 | Marella et al. ............. 501/95.1 |
| 6,274,524 | B1 | * | 8/2001 | Shinji et al. ................ 501/103 |
| 6,669,871 | B2 | * | 12/2003 | Kwon et al. ............ 252/520.21 |

FOREIGN PATENT DOCUMENTS

| EP | 214334 A | * | 3/1987 | ........... C04B/35/48 |
| JP | 01290557 A | * | 11/1989 | ........... C04B/35/48 |
| WO | WO 00/43327 | | 7/2000 | |

* cited by examiner

*Primary Examiner*—David Sample
(74) *Attorney, Agent, or Firm*—Townsend and Townsend and Crew LLP

(57) ABSTRACT

The present invention provides a semiconductive zirconia sintering material comprising more than 2% by weight of aluminum oxide and sintered zirconia material derived therefrom as well as a method of producing the sintered material. The sintered semiconductive zirconia materials of the present invention have a better physical and mechanical properties than conventional sintered semiconductive zirconia materials.

29 Claims, 1 Drawing Sheet

SEMICONDUCTIVE ZIRCONIA SINTERING MATERIAL COMPRISING ALUMINUM OXIDE

CROSS-REFERENCE TO RELATED APPLICATIONS

This application claims the benefit of U.S. Provisional Application No. 60/376,671, filed Apr. 29, 2002, which is incorporated herein by reference in its entirety.

FIELD OF THE INVENTION

The present invention provides a semiconductive zirconia sintering material, a sintered zirconia material derived therefrom, and a method for producing the sintered material.

BACKGROUND OF THE INVENTION

Ceramic sintering materials in which the principal component comprises alumina, zirconia, silicon nitride, and silicon carbide, etc. have high strength, high hardness, excellent heat resistance, and an excellent anticorrosive property. Thus, these ceramic materials are useful in a variety of applications.

Of many ceramic sintering materials conventionally available, zirconia sintering materials are especially useful in areas that require excellent mechanical strength and sliding characteristics. In particular, zirconia sintering materials are often used in mechanical device parts where great resistance to wear is required. Some of the applications for zirconia sintering materials include, but are not limited to, a conveying arm and a pincette for gripping a wafer in a semiconductor manufacturing device; a separating claw used in an image forming apparatus, such as a printer, etc.; and a tape guide used to convey and guide a tape-shaped material, such as a magnetic tape, etc. In these and many other applications, zirconia sintering materials also need to avoid excessive static electricity accumulation and rapid discharge of static electricity.

Unmodified zirconia materials have excellent mechanical characteristics but are typically also good electric insulators. Therefore, most mechanical parts or items made from unmodified zirconia materials are unable to safely dissipate static electricity and often result in arcing from the static electricity that is built-up. Often this static electricity arcing can severely damage electronic components within the device, a magnetic recording media or other materials on which the parts are used.

One can reduce the amount of static electricity build-up within the sintered zirconia material by adding a conductive additive to increase the electricity conductivity of the sintered zirconia material. Unfortunately, the addition of conductivity additive can create problems as well. For example, if the sintered zirconia material is excessively conductive, it can induce arcing between a charged object and the conductive sintered zirconia part. In addition, excessive addition of the conductive additive degrades the favorable mechanical properties of the sintered zirconia material.

U.S. Pat. No. 6,274,524 discusses a semiconductive zirconia sintering body which overcomes some of the problems associated with many conventional zirconia sintering bodies. The semiconductive zirconia sintering body discussed in U.S. Pat. No. 6,274,524 is purportedly able to discharge static electricity "at suitable speed without greatly reducing mechanical characteristics of zirconia." See the Abstract. However, the zirconia sintering material in U.S. Pat. No. 6,274,524 requires a relatively pure raw material powder (i.e., zirconia). In particular, U.S. Pat. No. 6,274,524 states that impurities such as "$Al_2O_3$, MnO, $SiO_2$, Na, Fe, etc. can be included in the raw material powder if these impurities have a weight % equal to or smaller than 2.0." See, for example, Col. 3, lines 29–33. Use of such a high purity raw material powder inherently increases the cost of the zirconia sintering material.

Therefore, there is a need for a semiconductive zirconia sintering material which does not require such a low impurity content requirement yet offers a substantially similar or better mechanical properties as currently available zirconia sintering materials.

SUMMARY OF THE INVENTION

One aspect of the present invention provides a semiconductive zirconia material having a volume specific resistance of from about $10^3$ to about $10^9$ Ω•cm, and preferably from $10^6$ to about $10^9$ Ω•cm. In particular, the semiconductive zirconia sintering material of the present invention comprises 60 to 90 weight % of $ZrO_2$, greater than 2% by weight of $Al_2O_3$ and 10 to 40 weight % of a conductive agent. Preferably, the semiconductive zirconia material is formed under oxidative conditions.

Another aspect of the present invention provides a semiconductive zirconia sintering material comprising 60 to 90 weight % of $ZrO_2$; between 2% and 5% by weight of $Al_2O_3$; and greater than 10 to about 40 weight % of a conductive agent comprising an oxide of Fe, Co, Ni, Cr or a mixture thereof.

Yet another aspect of the present invention provides a semiconductor manufacturing device comprising a sintered semiconductive zirconia material described above.

DETAILED DESCRIPTION

Figure 1:
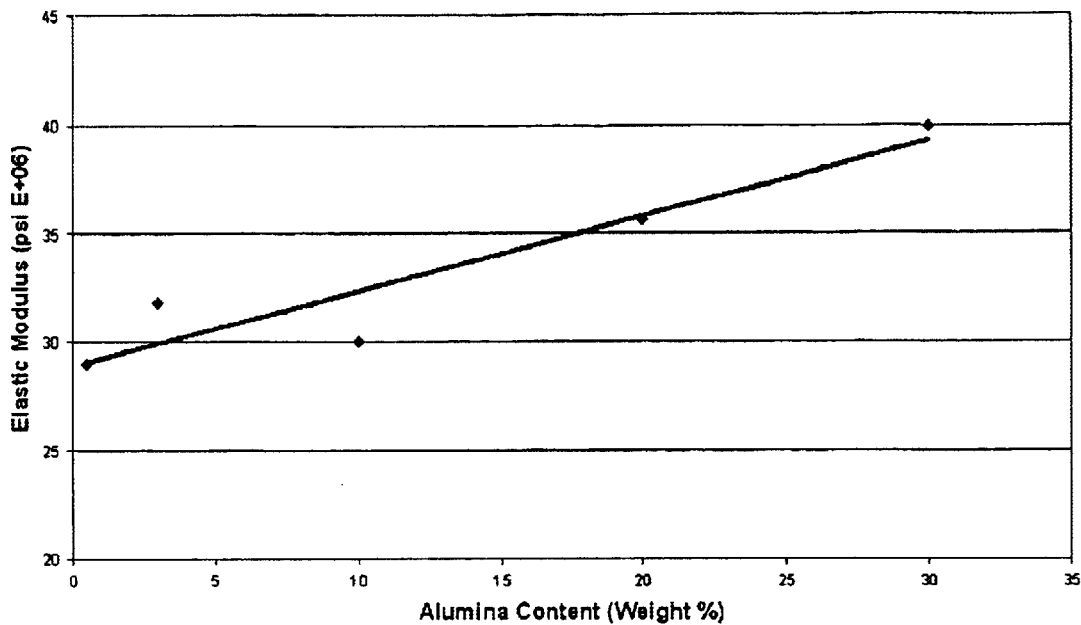
FIG. 1 is a graph showing the elastic modulus of sintered zirconia materials as a function of alumina content.
Figure 2:
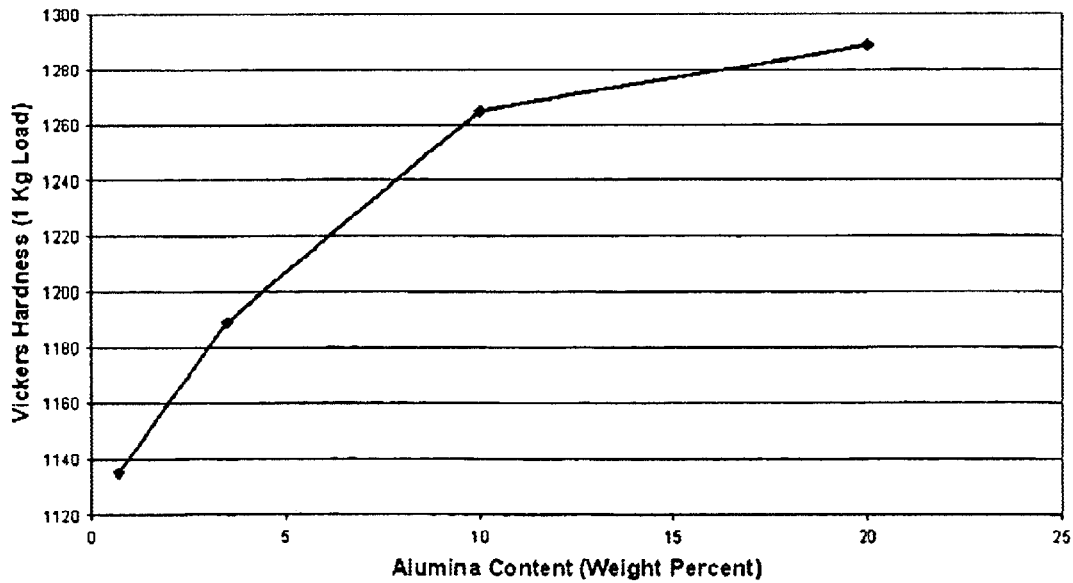
FIG. 2 is a graph showing the Vickers hardness ($Kg/mm^2$) of sintered zirconia materials as a function of alumina content.

As used herein, unless otherwise stated, the amount of a component present in the sintered semiconductive zirconia material refers to a weight percent relative to the total amount of the material present in the semiconductive zirconia material, excluding solvent(s), that is used to produce the sintered semiconductive zirconia material. For example, a sintered semiconductive zirconia material comprising 20% conductive material in which 5% is aluminum oxide means that the amount of aluminum oxide present is 5% by weight of the total weight of the semiconductive zirconia material, excluding solvent(s), that is used to produce the sintered semiconductive zirconia.

The present invention provides sintered semiconductive zirconia materials having a useful electrostatic dissipative property and having a high stiffness and hardness relative to the conventional sintered semiconductive zirconia materials. In particular, sintered semiconductive zirconia materials of the present invention have a volume specific resistance of at least about $10^6$ Ω•cm and a fracture toughness of at least about 7 Mpa•$m^{1/2}$.

In one embodiment, the volume specific resistance of sintered semiconductive zirconia materials of the present invention is in the range of from about $10^3$ to about $10^9$ Ω•cm. A particularly preferred volume specific resistance ranges from about $10^6$ to about $10^9$ Ω•cm.

In another embodiment, the fracture toughness of sintered semiconductive zirconia materials of the present invention ranges from about 6 to about 12 Mpa•$m^{1/2}$. A particularly preferred fracture toughness ranges from about 6.37 to about 9.26 Mpa•$m^{1/2}$.

Still in another embodiment, the fracture toughness of sintered semiconductive zirconia materials of the present invention is preferably at least about 7.15 Mpa•m$^{1/2}$. More preferably, at least about 7.3 Mpa•m$^{1/2}$, still more preferably at least about 7.5 Mpa•m$^{1/2}$, and most preferably at least about 8 Mpa•m$^{1/2}$.

Yet in one embodiment, sintered semiconductive zirconia materials of the present invention has a flexural strength of at least about 500 MPa, preferably at least about 600 MPa, and more preferably at least about 725 MPa.

Still in another embodiment, the sintered semiconductive zirconia material of the present invention has a high Vickers hardness of at least about 10 GPa, preferably at least about 11 GPa, and more preferably at least about 12 GPa.

In another embodiment, the sintered semiconductive zirconia material of the present invention has a stiffness (i.e., elastic modulus) of at least about 25×10$^6$ psi, preferably at least about 28×10$^6$ psi, and more preferably at least about 30×10$^6$ psi.

In one particular embodiment, the semiconductive zirconia material of the present invention comprises from about 60 to about 90 weight % of zirconium oxide (i.e., zirconia or $ZrO_2$), greater than 2% by weight of aluminum oxide (i.e., $Al_2O_3$) and 8 to 38 weight % of other conductive agent. Preferably, the total amount of the conductive agent, including aluminum oxide, is about 20%.

In one specific embodiment, the amount of aluminum oxide present in sintered semiconductive zirconia materials of the present invention is preferably between about 2% and about 20% by weight. More preferably, the amount of aluminum oxide present in the sintered semiconductive zirconia materials is between 5 and 15% by weight, and still more preferably about 10% by weight.

Throughout this disclosure, combinations of the preferred embodiments of any particular characteristics or physical properties described herein form other preferred embodiments. Thus, for example, in one particularly preferred embodiment, sintered semiconductive zirconia materials of the present invention have a fracture toughness of at least about 7 MPa•m$^{1/2}$ and a volume specific resistance of at least about 10$^6$ Ω•cm.

Zirconia

Typically, the average crystal particle diameter of zirconium oxide in the zirconia sintering material ranges from about 0.3 to about 40 μm, preferably from about 0.5 to about 5 μm, and more preferably from about 0.5 to about 1.5 μm. While these average crystal particle diameter sizes of zirconium oxide are generally preferred, it should be appreciated that the present invention is not limited to these particular average crystal particle diameter sizes of zirconium oxide.

Zirconium oxide can comprise a stabilizing agent. Exemplary stabilizing agents which are suitable in the present invention include, but are not limited to, $Y_2O_3$, MgO, CaO, and $CeO_2$. Preferably, the stabilizing agent is $Y_2O_3$. The amount of stabilizing agent present in zirconium oxide can vary depending on the particular stabilizing agent used. For example, when $Y_2O_3$ is used as a stabilizing agent, $Y_2O_3$ can be present in the range of from about 3 to about 9 mol % relative to the amount of zirconium oxide. When MgO is used as a stabilizing agent, MgO can be present in the range of from about 5 to about 15 mol % relative to the amount of zirconium oxide. When CaO is used as a stabilizing agent, CaO can be present in the range of from 8 to 12 mol % relative to the amount of zirconium oxide. And when $CeO_2$ is used as a stabilizing agent, typically it is present in the range of from 10 to 20 mol % relative to the amount of zirconium oxide. The stabilizing agent and zirconium oxide can be mixed in any manner, e.g., a coprecipitation method, which provides a uniform mixing. A coprecipitation method provides a fine and uniform dispersion of the stabilizing agents within zirconium oxide.

Without being bound by any theory, zirconia exists in three different crystal structures, i.e., cubic, tetragonal and monoclinic. When the stabilizing agents are added as discussed above, the total amount of tetragonal zirconia and cubic zirconia in the semiconductive sintering zirconia material is typically at least about 90%, preferably at least about 95%, and more preferably at least about 99%. Monoclinic zirconia making up the balance of the zirconia material.

The amount of each zirconia crystal structure present in the sintering material can be readily determined using any of the conventional methods known to one skilled in the art. For example, U.S. Pat. No. 6,274,524 discusses a method for measuring the amount of tetragonal and cubic zirconia crystals present in the zirconia sintering material using x-ray diffraction intensities.

The amount of conductive agent added to the semiconductive zirconia sintering material can affect physical characteristics of the sintered zirconia material. However, by adjusting the amount of each zirconia crystal structures in the mixture, one can adjust the strength of the resulting sintered zirconia material.

Conductive Agent

Surprisingly and unexpectedly, the present inventors have found that the presence of more than 2% by weight of aluminum oxide results in sintered semiconductive zirconia materials having a superior mechanical property relative to the conventional sintered semiconductive zirconia materials. This is in contrast to many conventional methods, including the methods discussed in U.S. Pat. No. 6,274,524, which attempt to limit the amount of impurities present in the conductive agent.

As used herein, "impurity" refers to minor material(s), including other conductive material(s), which are present or added to zirconium oxide (i.e., zirconia) in addition to the major conductive agent component. For example, when iron oxide (e.g., $Fe_2O_3$) is used as the conductive agent, typical impurities include aluminum oxide, manganese oxide (i.e., MnO), silicone oxide (i.e., $SiO_2$), sodium (i.e., Na), and iron (i.e., Fe). One or more of such impurities are typically present in iron oxide.

In contrast to conventional methods, the present inventor have found that inclusion of aluminum oxide in the amount of greater than 2% surprising and unexpectedly results in sintered semiconductive zirconia materials having improved physical and mechanical properties. For example, it has been found that sintered semiconductive materials of the present invention are harder and stiffer than conventional sintered semiconductive zirconia materials. Moreover, because a relatively large amount of aluminum oxide impurity can be present, the overall cost can also be significantly reduced due to no need for a highly pure zirconia as the starting material. In particular, the present inventors have found that the amount of aluminum oxide present in the semiconductive zirconia sintering material can be in the range of between, and not including, 2 and 20% by weight. Preferably, the amount of aluminum oxide present in the semiconductive zirconia sintering material of the present invention is between 5 and 15% by weight, and more preferably about 10% by weight.

The conductive agent is preferably an oxide of a transition metal. As used herein, the term "oxide of a transition metal" includes other forms of transition metals which can be converted to the transition metal oxide during processing. As such, the term "oxide of a transition metal" includes hydroxides and carbonates of transition metals. Preferably, the transition metal is Fe, Co, Ni or Cr. More preferably, the transition metal is Fe or Cr. The amount of a conductive agent and aluminum oxide present in the semiconductive zirconia sintering material can range from about 10 to about 40% by weight. Typically, in the range of greater than 10 to about 40% by weight of the conductive agent, including aluminum oxide, is used. Preferably, the total amount of conductive agent and aluminum oxide in sintered semiconductive zirconia materials of the present invention is in the range of from about 10 to about 30% by weight. More preferably, the total amount of a conductive agent and aluminum oxide in sintered semiconductive zirconia materials of the present invention is from about 15 to about 25% by weight, still more preferably about 20% by weight or less.

When the amount of conductive agent present in the sintering material is less than 10% by weight, the resulting material has a relatively high electric resistance, i.e., low conductivity. Conversely, when the amount of conductive agent present in the sintering material is greater than 40% by weight, the resulting sintered material has a relatively low electric resistance, i.e., high conductivity. A highly conductive material tends to discharge the electricity rapidly. Such dissipation can result from discharge of the electricity to the atmosphere with a high voltage. Furthermore, a high amount of the conductive agent in the zirconia sintering material reduces mechanical properties (e.g., flexural strength, fracture toughness value, hardness, etc.) of the sintered zirconia material.

As stated above, the presence of conductive agent reduces the insulating property of the sintered zirconia material of the present invention. Moreover, the conductive agent acts as a grain boundary phase, thereby providing a semiconductive property. In particular, the sintered zirconia material of the present invention has a volume specific resistance value (i.e., "resistance value") in the range of from about $10^3$ to about $10^{11}$ Ω•cm without significantly reducing the physical property, e.g., strength, of the sintered zirconia material. Preferably, the resistance value of sintered zirconia materials of the present invention is in the range of from about $10^5$ to about $10^{10}$ Ω•cm, and more preferably from about $10^6$ to about $10^9$ Ω•cm. The resulting semiconductive property of sintered zirconia materials of the present invention allows, among others, static electricity to be discharged relatively harmlessly. Thus, when an electrically sensitive object comes in contact with the sintered semiconductive zirconia material of the present invention, any static electricity that is present can be removed without damaging the object.

Moreover, since the conductive agents are oxides, the zirconia sintering materials of the present invention can be sintered in an oxidizing atmosphere. Thus, no special sintering apparatus is required. Furthermore, the conductive agents used in the present invention are widely available or can be readily obtained relatively inexpensively. Therefore, zirconia sintering materials of the present invention are inexpensive and can be readily manufactured.

Utility

The semiconductive zirconia sintering materials of the present invention can be used in a variety of applications. Typically, semiconductive zirconia sintering materials of the present invention are used in any device where a gradual static electricity removal is desired including in jigs and tools. For example, sintered semiconductive zirconia can be used in a semiconductor manufacturing device, e.g., as a thin conveying arm and a pincette for gripping a wafer. It can also be used in an image forming apparatus (e.g., a printer), as a separating claw used to separate paper from a roller. It can also be used as a magnetic head, electronic parts, separating claws, and a tape guide, which is used to convey and guide a tape-shaped material, e.g., magnetic tape. Other useful applications for the sintered semiconductive materials of the present invention are well known to one skilled in the art.

Sintering Process

Each of the components described above is combined and mixed in a dry or wet, e.g., slurry, form or a combination thereof. When the resulting mixture is a slurry it can be dried, e.g., by a spray drying process, to produce granules.

A die is then filled with the raw material either in the dry form or granules. The raw material powder and the granules are then molded in a predetermined shape by any of the conventional molding means known to one skilled in the art, e.g., mechanical press molding or rubber press molding, etc.

Alternatively, the slurry can be used directly without drying by molding in to a predetermined shape by any of the conventional molding processed known to one skilled in the art, e.g., extrusion molding, injection molding or tape casting, etc. The molded slurry is heated for about one to three hours in an oxidizing atmosphere. Typically, the heating temperature ranges from about 1250° C. to about 1550° C. Preferably, from about 1250° C. to about 1400° C., and more preferably about 1300° C. In general, it is difficult to sinter the molded slurry at temperatures below about 1250° C. Conversely, over sintering can result when the heating temperature is higher than about 1550° C.

Additional objects, advantages, and novel features of this invention will become apparent to those skilled in the art upon examination of the following examples thereof, which are not intended to be limiting.

EXAMPLES

Example 1

This example illustrates a process for producing a sintered zirconia material.

Zirconia powder, stabilized with 3.0 mole % $Y_2O_3$ is obtained from a coprecipitation process, with a starting grain size of about 0.3 to 0.8μ. This material is combined with $Fe_2O_3$ and $Al_2O_3$ powders in the proportions: stabilized $ZrO_2$, 75 weight %; $Fe_2O_3$, 15 weight %; and $Al_2O_3$, 10 weight %. This combined powder is milled in an aqueous medium with alumina ball media to produce a well-dispersed, fine particulate suspension. This suspension is then spray dried to remove substantially all of the water and produce a fine, flowable powder. This dry material is then compacted in a die via conventional dry pressing technology to produce the desired part shape. The powder compact is then sintered in a gas fired kiln at a peak temperature of about 1300° C. to produce a ceramic product with a flexural strength of 725 MPa, a fracture toughness of 8.4 MPa•m$^{1/2}$, a volume resistivity of 3×10$^8$ Ω-cm, and a Vickers hardness of 11.4 GPa.

Example 2

This example illustrates a relationship between the stiffness (i.e., elastic modulus) of sintered zirconia material and the amount of alumina content.

Sintered zirconia materials of varying alumina content were manufactured according to the procedure of Example 1 above. The elastic modulus of each sintered zirconia materials was measured using the ASTM-C848 testing procedure. The results are shown in FIG. 1

In general, as the amount of alumina content increases the sintered zirconia material becomes stiffer.

Example 3

This example illustrates a relationship between the hardness of sintered zirconia material and the amount of alumina content at various iron oxide ($Fe_2O_3$) content.

Sintered zirconia materials of varying alumina content and iron oxide ($Fe_2O_3$) content were manufactured according to the procedure of Example 1 above. The Vickers hardness of each sintered zirconia materials was measured using the ASTM E-18 testing procedure. As shown in FIG.

2, as the amount of alumina content increases, the sintered zirconia material becomes harder.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All publications, patents, and patent applications cited herein are hereby incorporated by reference in their entirety for all purposes.

What is claimed is:

1. A conductive zirconia sintering material having a volume specific resistance of at least about $10^6$ Ω•cm, wherein said zirconia sintering material comprises:
   (a) 60 to 90 weight % of $ZrO_2$;
   (b) greater than 2% by weight of $Al_2O_3$; and
   (c) 8 to about 38 weight % of a conductive agent.

2. The semiconductive zirconia sintering material of claim 1, wherein a fracture toughness of said sintering material is at least about 7 Mpa•m$^{1/2}$.

3. The semiconductive zirconia sintering material of claim 1, wherein the total amount of $Al_2O_3$ and the conductive agent in said sintering material is about 10–40%.

4. The semiconductive zirconia sintering material of claim 1, wherein the total amount of $Al_2O_3$ and the conductive agent in said sintering material is about 20% or less.

5. The semiconductive zirconia sintering material of claim 1, wherein said $ZrO_2$ further comprises a stabilizing agent.

6. The semiconductive zirconia sintering material of claim 5, wherein said stabilizing agent is yttrium oxide, or any rare earth oxide.

7. The semiconductive zirconia sintering material of claim 6, wherein the amount of said stabilizing agent present in said zirconia sintering material is from about 2 to about 20 mol % relative to the amount of $ZrO_2$.

8. The semiconductive zirconia sintering material of claim 5, wherein said zirconia material comprises greater than 2% to about 20% by weight of $Al_2O_3$.

9. The semiconductive zirconia sintering material of claim 8, wherein said zirconia material comprises between 5% to 15% by weight of $Al_2O_3$.

10. The semiconductive zirconia sintering material of claim 9, wherein said zirconia material comprises about 10% by weight of $Al_2O_3$.

11. The semiconductive zirconia sintering material of claim 1, wherein said conductive agent is an oxide of a transition metal.

12. The semiconductive zirconia sintering material of claim 11, wherein said transition metal is selected from the group consisting of Fe, Co, Ni, Cr and a mixture thereof.

13. The semiconductive zirconia sintering material of claim 12, wherein said transition metal is Fe or Cr.

14. The semiconductive zirconia sintering material of claim 1, wherein said zirconia material has a three-point flexural strength of at least about 500 Mpa.

15. The semiconductive zirconia sintering material of claim 1, wherein said zirconia material has a volume specific resistance range of from about $10^6$ to about $10^9$ Ω•cm.

16. The semiconductive zirconia sintering material of claim 1, wherein said zirconia material has an elastic modulus of at least about $25 \times 10^6$ psi.

17. A semiconductive zirconia sintering material having a volume specific resistance of from about $10^3$ Ω•cm to about $10^9$ Ω•cm, a fracture toughness of greater than about 7 Mpa•m$^{1/2}$ and comprising zirconia, a conductive agent, and greater than 2% by weight of aluminum oxide.

18. The semiconductive zirconia sintering material of claim 17, wherein the amount of conductive agent is about 20% or less.

19. The semiconductive zirconia sintering material of claim 18, wherein said conductive agent is iron oxide.

20. The semiconductive zirconia sintering material of claim 19, comprising about 17% by weight of iron oxide and about 10% by weight of aluminum oxide.

21. A semiconductor manufacturing device comprising a semiconductive zirconia material of claim 1.

22. A method for producing a semiconductive zirconia material having a volume specific resistance of at least about $10^6$ Ω•cm and having a fracture toughness of at least about 7 Mpa•m$^{1/2}$, said method comprising:
   (a) providing an admixture comprising at least about 80% by weight of zirconia and about 10% to about 40% by weight of a conductive material, and more than 2% by weight of aluminum oxide relative to the total weight of the admixture; and
   (b) sintering the admixture under conditions sufficient to produce the sintered semiconductive zirconia material.

23. The method of claim 22, wherein said step of sintering comprises heating the admixture at a temperature range from about 1250° C. to about 1550° C.

24. The method of claim 23, wherein said admixture is heated under an oxidative condition.

25. The method of claim 22, wherein the conductive material comprises iron oxide.

26. A semiconductive zirconia sintering material having a volume specific resistance of from about $10^3$ Ω•cm to about $10^9$ Ω•cm, a fracture toughness of greater than about 7 Mpa•m$^{1/2}$ and comprising:
   (a) zirconia,
   (b) about 15% to about 25%, by weight, iron oxide, and
   (c) greater than 2% by weight of aluminum oxide.

27. The semiconductive zirconia sintering material of claim 26, comprising about 17% by weight of iron oxide.

28. The semiconductive zirconia sintering material of claim 26, comprising about 10% by weight of aluminum oxide.

29. The semiconductive zirconia sintering material of claim 26, comprising about 60 to 90 weight % of zirconia.

* * * * *